US010691582B2

(12) United States Patent
Kuner et al.

(10) Patent No.: US 10,691,582 B2
(45) Date of Patent: Jun. 23, 2020

(54) CODE COVERAGE

(71) Applicant: Sony Interactive Entertainment LLC, San Mateo, CA (US)

(72) Inventors: John Afsal Elias Kuner, San Francisco, CA (US); Jun Yu, San Rafael, CA (US); Zhou J. Deng, Walnut Creek, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 15/991,391

(22) Filed: May 29, 2018

(65) Prior Publication Data
US 2019/0370156 A1 Dec. 5, 2019

(51) Int. Cl.
| | |
|---|---|
| G06F 9/44 | (2018.01) |
| G06F 11/36 | (2006.01) |
| G06F 8/71 | (2018.01) |
| G06F 21/52 | (2013.01) |

(52) U.S. Cl.
CPC .......... G06F 11/3676 (2013.01); G06F 8/71 (2013.01); G06F 11/3684 (2013.01); G06F 11/3688 (2013.01); G06F 21/52 (2013.01)

(58) Field of Classification Search
CPC .......... G06F 11/3688; G06F 11/3664; G06F 11/3684; G06F 11/362; G06F 11/3672
USPC ........................................................ 717/124
See application file for complete search history.

(56) References Cited

U.S. PATENT DOCUMENTS

| | | | |
|---|---|---|---|
| 8,001,422 B1 | 8/2011 | Sun et al. | |
| 2007/0240154 A1* | 10/2007 | Gerzymisch | G06F 8/61 717/174 |
| 2008/0301511 A1 | 12/2008 | Miller et al. | |
| 2012/0124413 A1 | 5/2012 | Bauer et al. | |
| 2014/0089735 A1 | 3/2014 | Barrett et al. | |
| 2015/0020055 A1* | 1/2015 | Nayak | G06F 11/368 717/125 |
| 2015/0135158 A1* | 5/2015 | Tenev | G06F 11/3684 717/101 |
| 2015/0347284 A1* | 12/2015 | Hey | G06F 11/3692 717/125 |
| 2017/0245013 A1 | 8/2017 | Wolff | |
| 2018/0039565 A1 | 2/2018 | Rajagopalan et al. | |
| 2018/0373865 A1 | 12/2018 | Acar et al. | |
| 2019/0354466 A1 | 11/2019 | Fok | |

OTHER PUBLICATIONS

U.S. Appl. No. 15/984,216, Stephanie Fok Shadow, Shadow Testing, filed May 18, 2018.
U.S. Appl. No. 15/984,216 Office Action dated Jan. 10, 2020.

\* cited by examiner

*Primary Examiner* — Chuck O Kendall
(74) *Attorney, Agent, or Firm* — Polsinelli LLP

(57) ABSTRACT

The present disclosure describes methods and systems directed towards providing code coverage during software development. Implementation of code coverage assist developers in visualizing what portions of new code being developed can be tested via available tests as well as evaluating those portions of new code. The testing of the new code in this manner allows developers to understand whether portions of the new code have been developed properly. When the new code is determined to be satisfactory, via the tests and coverage, the new code can be incorporated into the master code branch. By testing the new code before merging, interruptions and downtime associated with the master code branch can be minimized.

20 Claims, 5 Drawing Sheets

CODE COVERAGE

BACKGROUND

Field of Invention

The present invention generally relates to software development. More specifically, the present invention relates to identifying code coverage for the purpose of testing newly developed code before merging into a master code branch.

Description of the Related Art

Software development is a process of conceiving, specifying, designing, programming, documenting, testing, and bug fixing involved in creating and maintaining applications, frameworks, or other software components. A software development process is a framework that uses a structured plan to control the process of developing information systems. There are several different approaches to software development ranging from more structured, engineering-based approach to develop business solutions whereas others take a more incremental approach where software evolves as it is developed piece by piece. Each methodology may be chosen based on the specific kind of project.

Most software development methodologies share some combination of the following stages of software development: analyzing the problem, market research, gathering requirements for the proposed business solution, devising a plan or design for the software-based solution, implementing (or coding) of the software, testing the software, deployment, and maintenance/bug fixing. The stages are often referred collectively as the software development lifecycle. Different approaches may carry out the stages in different orders or devote more or less time to each stage.

An example approach (e.g. waterfall based approach) attempts to assess the majority of risks and develop a detailed plan for the software before implementation (coding) begins. Such approach would minimize design changes and re-coding at a later stage of the development life cycle planning. Another approach may involve less time spent on planning and documentation and more time on coding and development of automated tests. This latter approach may use more continuous testing throughout the development lifecycle as well as having a working (or bug-free) product at all times.

Presently for development of software applications, there may be multiple teams of programmers and developers working on a single project that may be broken down into smaller portions for teams to complete. Therefore, communication between teams would be needed in order to monitor and ensure that development of code is compatible with other aspects of the same project. If issues arise, the teams would need to work with each other to identify where the issues arise and how best to overcome the issue.

Furthermore as software becomes more complex, the work that one team does may impact a vast number of other groups. Additionally, software developed between different teams may not be initially compatible.

There is a need to provide a process to assist in the evaluation of the software being developed prior to merging the new code with the main code branch. This would include identifying whether the new code would be acceptable to merge with the main code branch and whether the new code would be compatible with code that other groups are developing as well.

SUMMARY OF THE CLAIMED INVENTION

Embodiments of the present invention include methods for providing code coverage during software development. The method includes receiving new code from a developer whereby the new code is to be merged with a master code branch which corresponds to an operational software application. The new code seeks to implement a new feature to the existing operational software application. The developer also generates tests corresponding to the new code that is received, the tests are used to evaluate that the new code operates as intended. After receiving the new code and corresponding tests, the new code is evaluated using the tests. The results from the testing of the new code is used to generate a visual display for the developer that includes information about what portions of the code is covered by the tests and what the outcome of the tests are. The test results and the tests are stored in memory. Finally, the new code can be merged into the master code branch.

Embodiments of the present invention also include systems for providing code coverage during software development. The system includes a development platform that receives new code developed by a developer to be merged into a master code branch. The master code branch corresponds to an operational software application and the new code seeks to implement a new feature for the operational software application. The development platform also receives tests from the developer corresponding to the new code that are used to evaluate if the new code operates as intended. The test database is used to store test results from the evaluation of the new code using the received test as well as the received tests. A plurality of computing devices are provided for the developers to generate new code and corresponding tests. Lastly, a processor is included that includes instructions stored in memory that are executed to instruct the processor to evaluate the new code using the tests. The information generated from the tests associated with the new code are used to generate a visual display of the results. The visual display includes illustrating what portions of the new code are covered by the tests, and outcomes of the tests for portions of the new code. The processor can also merge the new code into the master code branch.

DETAILED DESCRIPTION

The present disclosure describes methods and systems for identifying code coverage during software development and evaluating if the newly developed code can be satisfactorily merged into a master code branch. The identification of code coverage facilitates evaluation of one or more portions of new code in order to determine whether the portions of new code have corresponding tests that can be used to evaluate if the new code has been developed properly. Testing and debugging can be performed on portions of code using a number of different tests so the code coverage is used to illustrate if the tests cover a sufficient portion of the new code. Only when a pre-determined threshold amount of new code are covered and the test results of the covered code are satisfactory can the new code then be merged with the master code branch. In this way, code coverage facilitates the development of new code as well as ensures that the newly developed code works with the existing code in the master code branch.

A variety of tests can be performed on the new code that would test the function of the new code as well as the interactions of the new code with other code (such as the existing code in the master code branch). These tests are created by the developers or also obtained from a database of stored tests. Developers are then informed what portions of the new code are covered by tests (pre-existing or newly created by the developer) and whether the new code works properly. This information is then used by the developer to identify potential issues and solutions to the new code prior to merging the new code into the master code branch.

The tests are performed on the new code prior without the new code being merged with the master code branch thereby prevent interruption to the master code branch. Therefore, code coverage is useful in illustrating what portions of the new code are covered by tests and inform the developer if the new code is working as intended. Code coverage assist developers in creating test to identify and debug issues with each new set of code being developed by providing a display that illustrates how much of the new code is covered by the tests as well as the outcome of the tests. The display provides a visual user interface that shows where issues may arise or may have arisen between the new code and potentially with other code (e.g. portions of the master code branch). The issues with the new code can be flagged using various indicators that can provide easy-to-read information regarding the type of problems that have been detected. If no issues are present, the new code can then be merged into the master code branch.

Figure 1:
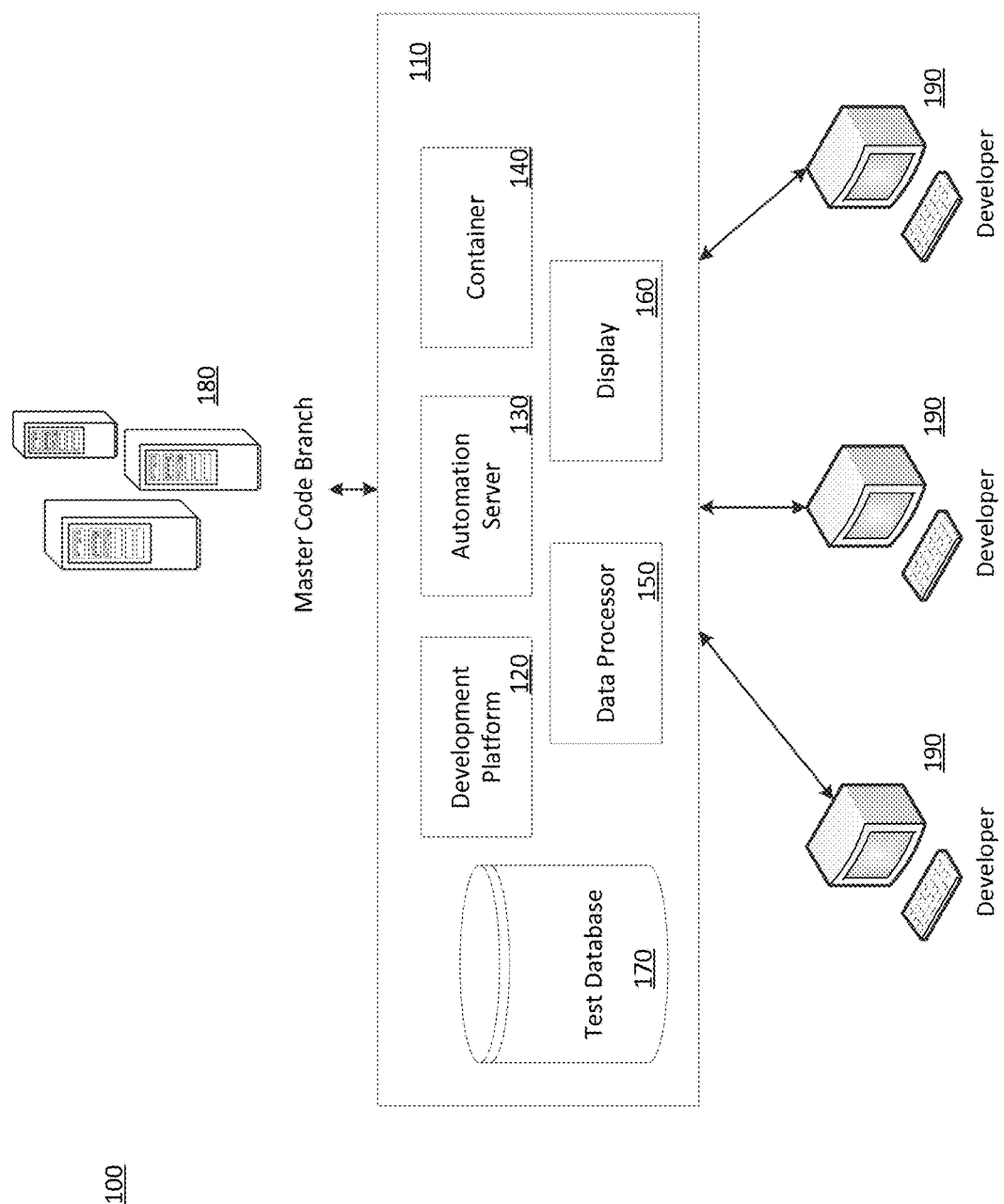
FIG. 1 illustrates a system for providing code coverage during software development.

FIG. 1 illustrates a system 100 for providing code coverage during software development. The system 100 includes a test environment 110 that is used to identify code coverage for new code and whether the new code operates properly. The test environment 110 can be accessed by any number of different developers 190 who may all be working on different portions of the same project (e.g. developing code for their respective features). The test environment 110 would be used to test the new code and identify how much of the new code is currently covered by the testing. The a pre-determined threshold of coverage and tests have been satisfied by the new code, the new code can then be merged with the master code branch 180.

The test environment 110 utilizes a number of features 120-160 in order to identify and display code coverage and results of the test on the new code that developers develop on their respective computing devices 190. The results from the tests can be stored in the test database 170. In some embodiments, the tests that the developers 190 create to evaluate the new code can also be stored in the test database 170.

Once the new code is determined to have sufficient code coverage (e.g. there are tests that cover a pre-determined threshold of the new code) and the new code provides satisfactory test results, the developer 190 can proceed to merge the new code with the master code branch 180.

Details regarding each of the elements of the system 100 for providing code coverage will be provided below.

The test environment 110 of FIG. 1 is used by developers 190 to test their new code prior to merging with the master code branch 180. The test environment 110 is accessible by any number of computing devices. It would be possible to have the test environment 110 be carried out in the cloud (or Internet), via one or more computing devices, or a combination of both physical and cloud-based computing resources.

As illustrated in FIG. 1, the test environment 110 includes a number of elements 120-160 that are used to carry out the testing of the new code, although more or less features may be added or removed as needed. As noted above, the test environment 110—specifically the elements 120-160 of the test environment 110—may be performed using a combination of multiple computing devices, servers, or other computing networks in connection with the testing environment 110. All the elements 120-160 of the test environment 110 do not need to be performed at the testing environment 110.

The test environment 110, of FIG. 1, includes a development platform 120 that provides a means for user interaction between developers 190 on their respective computing devices with the test environment 110. The development platform 120 provides user interface elements that facilitate the developers 190 to submit their developed new code as well as specifically created tests to test the operation of the new code into the test environment 110. A pull request may be generated by the development platform 120 to inform other developers 190 working on the same project that new code and/or tests have been submitted for review.

Once the new code and corresponding tests created by the developer 190 have been submitted to the development platform 120, the test environment 110 next takes steps to evaluate the performance of the new code. The automation server 130 is used to build/compile the new code into an executable that is stored and run in the container 140. The automation server 130 also runs the tests submitted by the developer 190 on the compiled code in the container 140 and identifies if any issues arise during the building/compilation of the new code. The automation server 130 provides information related to the tests run on the new code to the data processor 150 of the test environment 110.

The data processor 150 takes in the information from the automation server 130 in order to determine 1) what portions of the new code are covered by the tests created and submitted concurrently with the new code, and 2) whether the new code passes the submitted tests. The results of the processing of the information from the automation server 130 are then sent to the display 160 so that users can view. The results (as well as the tests used to obtain the results) can then be stored in the test database 170.

Figure 3:
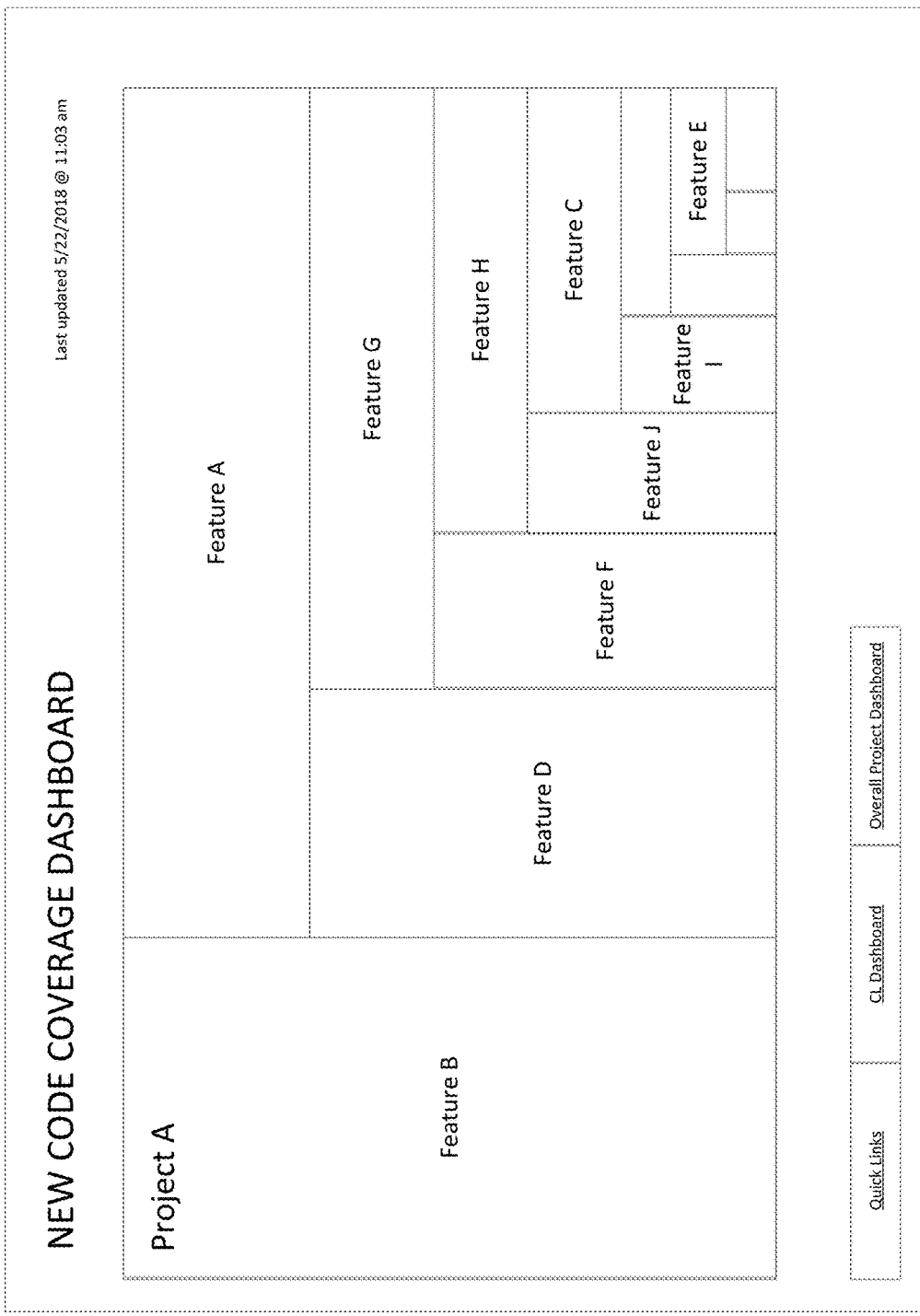
FIG. 3 illustrates a dashboard showing code coverage for an entire project.
Figure 4:
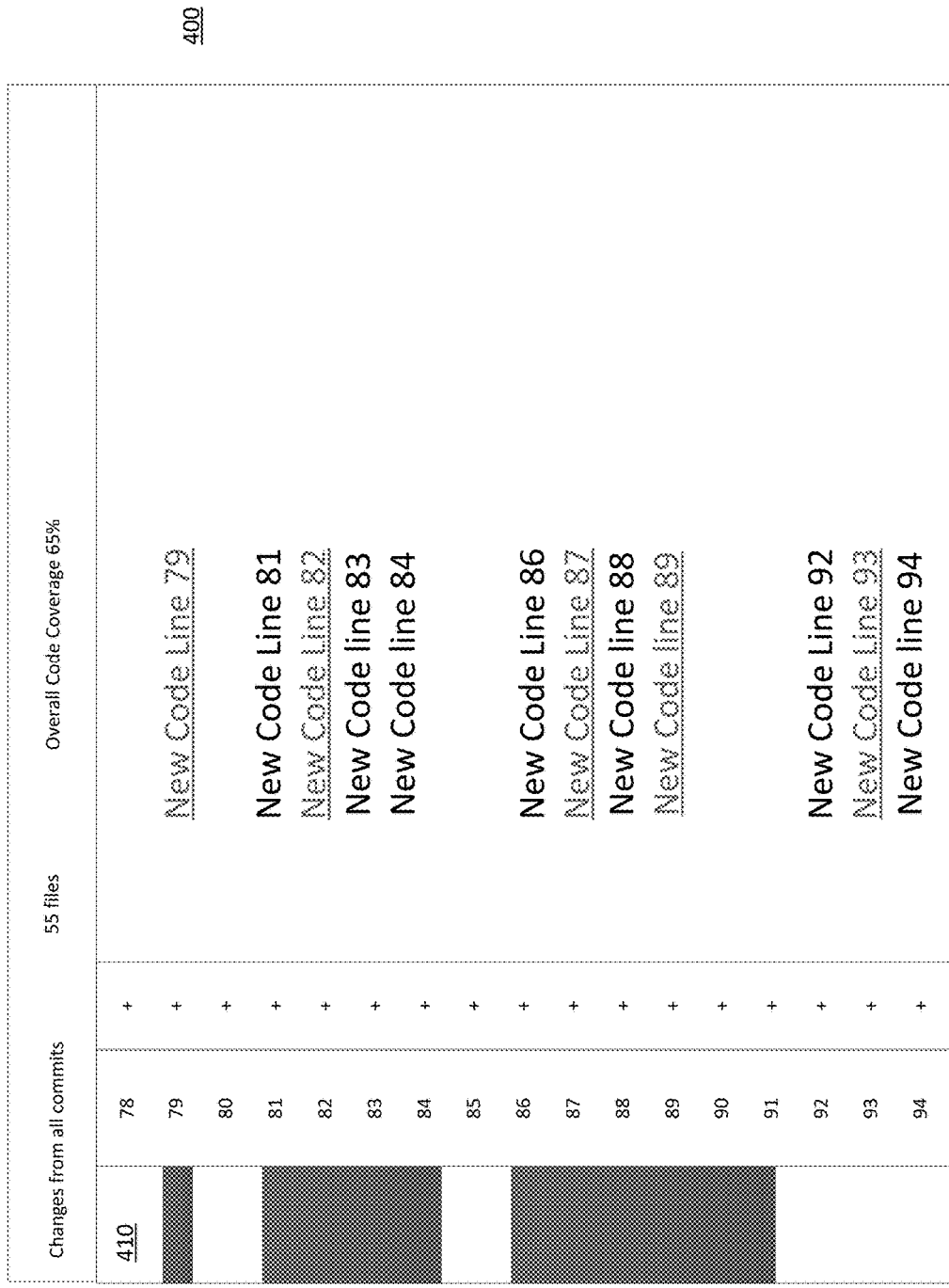
FIG. 4 illustrates a code coverage display.

The display 160 may include a variety of different visual elements that can be used to illustrate code coverage with respect to the new code as well as with respect to the master code branch 180. For example, FIG. 3 illustrates code coverage for an entire project while FIG. 4 illustrates code coverage for a particular set of new code being developed.

The display 160 can also be used to illustrate how the new code would interact with the master code branch 180 and other sets of code being developed by other programmers 190. The display is capable of illustrating issues (e.g. incompatibility, bugs, errors) regarding the tested new code and other code and/or the code in the master code branch. The illustrations could utilize color coded symbols/icons that indicate that the new code is covered by an existing test as well as that the new code is compatible/works as intended with respect to the master code branch 180.

Furthermore, the display 160 can be used to illustrate the types of issues that have been detected via the tests run by the automation server 130 and processed via the data processor 150. Different icons can be used to identify different types of issues. A key can also be provided in the display 160 so that developers 190 know what issues have been detected. Colors can also be used to identify a severity of the detected problem. For example, a color (e.g. red) associated with an icon can identify a severe problem that would result in the failure of the new code (and possibly the master code branch 180 if the new code is merged). Alternatively, a different color (e.g. yellow) associated with an icon may indicate that the new code works but that possible issues may arise if the new code is merged with the master code branch 180 without further testing.

The display 160 allows developers 190 a way to view particular portions of the new code being tested on the test environment 110 and identify which portions are not currently tested. In doing so, the developers 190 are then able to modify the new code as needed or generate additional tests to provide coverage for portions of the new code that was not previously covered. Additionally developers 190 may also be allowed to provide commentary tied to the uploaded new code so that other developers 190 reviewing the new code being tested on the testing environment 110 may understand the purpose of the new code or implement further tests. It may also be possible for other developers 190 to also provide suggestions regarding what tests should be run or modifications to be made to the new code through the testing environment 110.

As described above, developers 190 not only create new code but also create corresponding tests so that evaluations on the new code can determine if the new code is working as intended. The tests are associated with the new code and can be stored in the test database 170 for future reference—such as to ensure that the new code after being merged—still operates as intended when further new code is used to modify the master code branch.

The tests that are used on the new code can be directed to any number of different issues that may be of concern relating to the master code branch. For example, the tests can identify compatibility issues between the new code, other new code, and/or the master code branch 180. Tests can also identify if any security issues arise with the new code so that security issues are not introduced into the master code branch 180.

Aside from generating new tests for each new code, it may also be possible for developers 190 to access and modify previous tests stored in the test database 170. For example, developers 190 may be allowed to retrieve an existing test stored on the test database 170, generate a copy of the retrieved test, and modify the copy to identify and evaluate the new code with respect to new issues that need to be detected. For example, the modified code may include further scenarios, conditions, or issues that were not previously considered. The modified copy can then be stored as a new test in the test database 170 for subsequent use by any developer 190.

Since developers 190 may write new code differently, each set of new code may have compatibility issues (e.g. naming variables differently) that could lead to portions of code to be inoperable if implemented without prior testing. The test environment 110 would be used to cover scenarios of how the new code would operate in the context of other code and the master code branch. For example, if the new code being tested is supposed to process information coming from a second set of code and provide an output to a third set of code, the test would run through various scenarios to ensure that such process and output is performed as intended.

These tests can be updated to include scenarios that have previously raised issues in the past. For example, if for some reason a certain value being processed and outputted by the new code being test in the past produced an error in connection with a different set of code and/or the master code branch 180, the tests can include the specific value to ensure that the issue does not persist in future new code being developed.

The test environment 110 may require that each new code be "covered" by a pre-requisite number of tests and have a pre-requisite number of passing tests prior to being merged with the master code branch 180. For example, the test environment 110 may require that at least 70% of new code must have a test that covers portions of the new code to ensure that the new code operates as intended. Furthermore, of the tests that are run on the new code, 90% of the tests must provide a positive result. The thresholds are customizable based on the user but at least are used to influence the quality of the new code prior to merging with the master code branch 180.

It is also possible to have the test environment 110 include an AI module (not shown) that identifies what type of tests the new code should be evaluated with. In situations where prior tests are stored in the test database 170, the test environment 110 may choose to have any number of stored tests be run as well to ensure that the new code does not interfere with other code that is known to exist in the master code branch 180.

The master code branch 180 corresponds to the actual code (and backup copies if needed) that is used to execute the software application being developed. The software application associated with the master code branch 180 may be a currently operational software application currently in use by various consumers. The system 100 allows for continued development of new code that modifies the software application by testing that the new code is operable with the master code branch 180 prior to merging. The system 100, therefore, is able to minimize disruptions to the operation of the application software.

With each modification made to the master code branch 180, backup copies may be made of previous versions and stored. If for some reason issues arise after the merging of the new code, it would then be possible to recover the previous version of the master code branch 180. Safeguards can also be added that would prevent changes to the master code branch 180 (e.g. merging of new code) if a pre-determined number of tests for the new code fail or if a pre-determined percentage of the new code is not covered by any tests.

The developer 190 may be an individual associated with their own computing device that develops not only the new code but also the tests used to evaluate if the new code operates properly. The new code may be, for example, a new feature being implemented in the software application.

Figure 2:
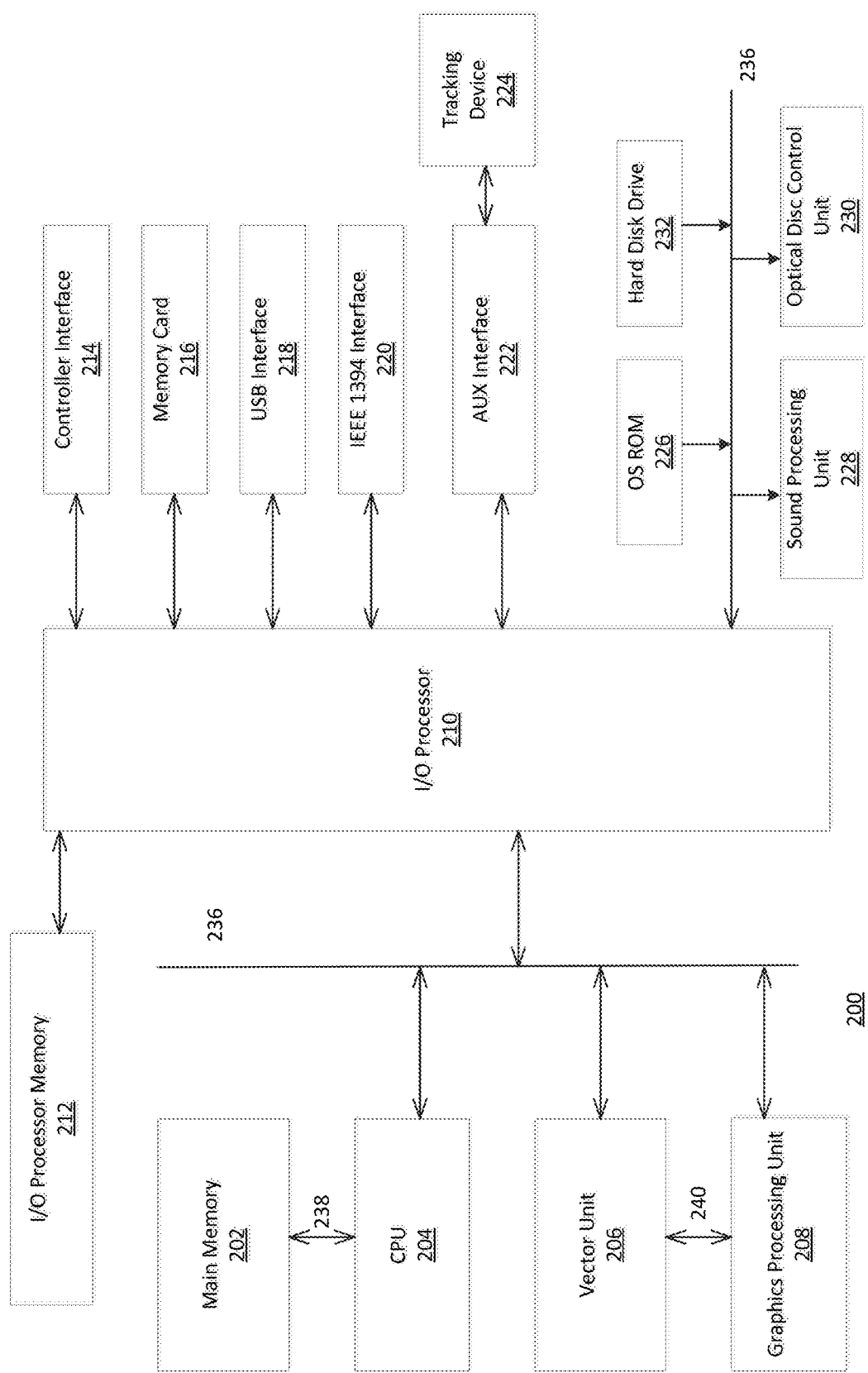
FIG. 2 is an example computing device used in context of the system for code coverage of FIG. 1.

FIG. 2 is an example computing device 200 used in context of the system for code coverage of FIG. 1. The computing device 200 (which in some cases may also include other types of computing devices such as desktops, laptops, tablets, gaming console, and mobile devices) is a device that can be utilized by developers for software development as illustrated in FIG. 1 for providing code coverage.

The computing device 200 may include various elements as illustrated in FIG. 2, however, it should be noted that the elements are exemplary and that other embodiments may incorporate more or less than the elements illustrated. With reference to FIG. 2, the computing device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, an auxiliary (AUX) interface 222 for connecting a tracking device 224, although other bus standards and interfaces may be utilized. The computing device 200 further includes an operating system read-only memory (OS ROM) 226, a sound processing unit 228, an optical disc control unit 230, and a hard disc drive 232, which are connected via a bus 234 to the I/O processor 210. The computing device 200 includes at least one tracking device 224.

The tracking device 224 may be a camera, which includes eye-tracking capabilities. The camera may be integrated into or attached as a peripheral device to the computing device 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to computing device 200 that captures voice data. The microphone may conduct acoustic source localization and/or ambient noise suppression. The microphones may be usable to receive verbal instructions from the user to schedule, retrieve and display content on the computing device 200.

Alternatively, tracking device 224 may be the controller of the computing device 200. The controller may use a combination of built-in accelerometers and infrared detection to sense its position in 3D space when pointed at the LEDs in a sensor nearby, attached to, or integrated into the console of the entertainment system. This design allows users to control functionalities of the computing device 200 with physical gestures as well as button-presses. The controller connects to the computing device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the computing device 200 instead can be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the computing device 200 including the CPU 204, the vector unit 206, the graphics processing unit 208, and the controller interface 214.

The graphics processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics processing unit 208. Furthermore, the sound processing unit 230 executes instructions to produce sound signals that are outputted to an audio device such as speakers (not shown).

A user of the computing device 200 provides instructions via the controller interface 214 to the CPU 204. For example, the user may instruct the CPU 204 to store certain information on the memory card 216 or instruct the computing device 200 to perform some specified action. Example controllers associated with the controller interface 214 may include a touch-screen, keyboards and game controllers.

Other devices may be connected to the computing device 200 via the USB interface 218, the IEEE 1394 interface 220, and the AUX interface 222. Specifically, a tracking device 224, including a camera or a sensor may be connected to the computing device 200 via the AUX interface 222, while a controller may be connected via the USB interface 218.

FIG. 3 illustrates a dashboard 300 showing code coverage for an entire project. The dashboard 300 can represent any number of different projects which can further be broken down into smaller component tasks (e.g. features) corresponding to one or more developers responsible for writing code to implement those tasks. These tasks can be represented, for example, as particular features that are being implemented into a particular software application.

As illustrated in the figure, there are a number of rectangles with varying sizes and shapes. These rectangles each represent a task within the overall project (e.g. project A). For example, teach task can correspond to a feature being implemented into the software application. The size of the rectangles can be used to represent the proportional size of the new code associated with implementing that feature. The larger the rectangle, the more code the developer currently has written to carry out the feature.

The color of the rectangle can be used to represent the status of the new code associated with implementing that feature. For example, the color of the rectangle can indicate amount of code coverage that the new code currently has. Green, for example, can indicate that a satisfactory amount of the code (e.g. above a pre-determined threshold) has relevant tests that provides testing coverage for the new code being developed. Other colors (such as yellow or red) can provide different lower threshold amounts of coverage for codes. This can indicate that the developer would need to provide more tests to cover more of the new code than currently available. The color shown in the dashboard can also be used to similarly indicate that the tests on the new code are being passed or failed.

Although FIG. 3 illustrates an overview of code coverage for a particular project, it may be possible that further details about specific portions of the project can also be retrieved. For example, if a developer interacts with a particular rectangle on the dashboard, further information about the new code associated with rectangle can be provided for viewing. For example, the new code for that rectangle, the tests that are created (or previously stored), and any results can also be provided for viewing.

Furthermore, interaction with other elements within the dashboard 300 may allow for the viewing of other related dashboards. For example, there may be an option that allows users to view an overall project dashboard which includes not only the project illustrated in FIG. 3 (e.g. project A) but also other projects that may be simultaneously developed.

FIG. 4 illustrates a code coverage display 400. The display 400 is a user interface that shows the lines of new code that the developer has written, for example, for the purposes of modifying or adding a new function to the software application. Color coding within the lines of code can be used to identify code coverage (e.g. what portions of the new code are currently being covered by available tests) as well as what portions of the new code has changed between version. The display 400 may also include other information such as how large the new code is (e.g. how many lines) and current status of code coverage for the current set of new code being reviewed.

For example, in the figure, different colored texts can be used to illustrate changes between versions of the new code. Text highlighted in red may indicate that that term, phrase, or line has been added since the previous version that was tested. Colors can also be used to identify known variables/objects as well as identify terms not recognized via the compiler (e.g. spelling errors). Other means of highlighting differences between versions (e.g. underlining, bold, italicizing text) can also be used.

A code coverage indicator column 410 can be used to identify whether tests are available to evaluate corresponding lines of code. A marking (e.g. red box, symbol) can be used to signify that no tests are available to test that particular line of code. If no marking is present within the column 410, this may be indicative that at least one test is available to evaluate that portion of the new code. As the new code becomes modified (e.g. adding additional lines of code, modifying elements within the lines of code), the column 410 is updated as some tests may not be applicable with the new code.

Figure 5:
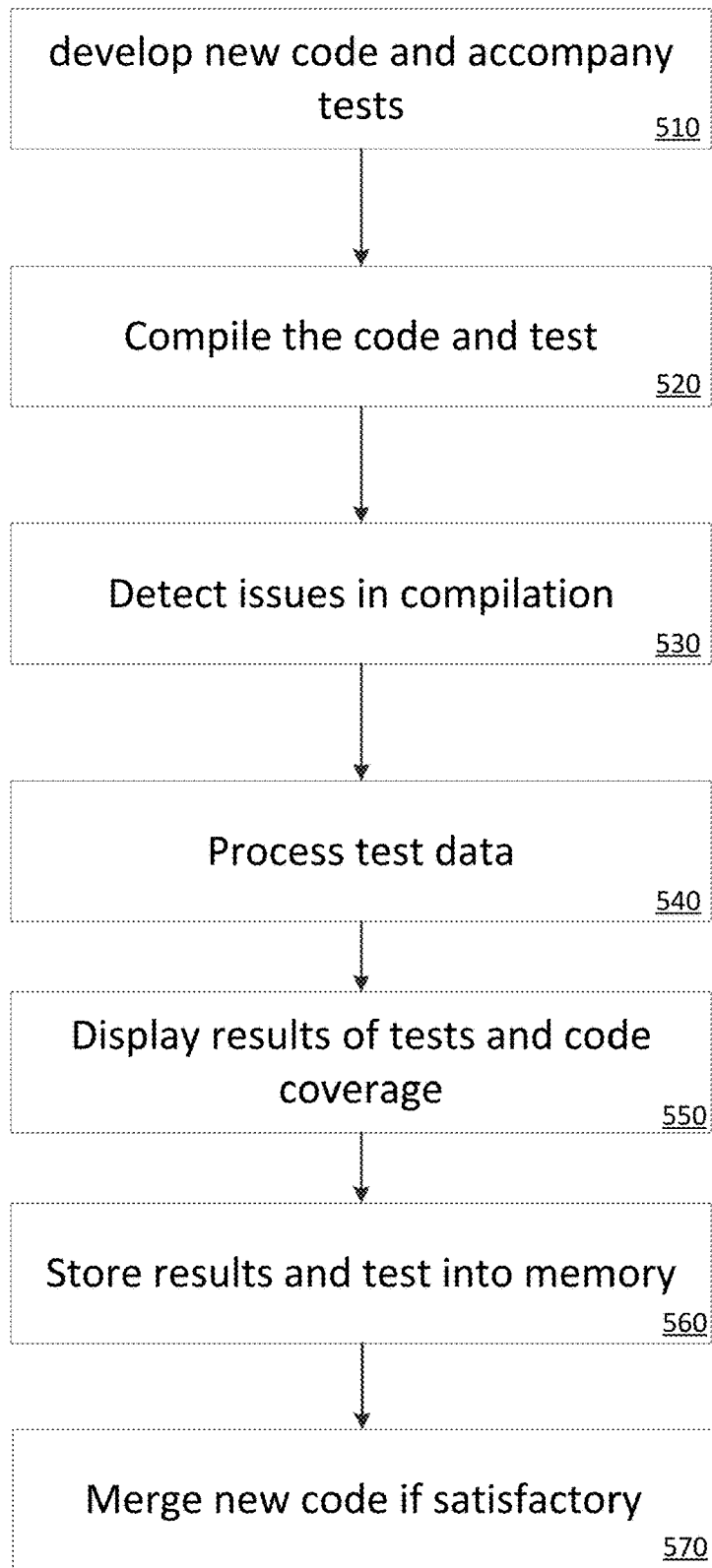
FIG. 5 is a flowchart detailing the steps for performing code coverage.

FIG. 5 is a flowchart 500 detailing the steps for performing code coverage. The flowchart 500 shows how developers first need to develop the new code and accompany tests. The test environment can then be used to build/compile the new code into an executable that can be tested using the tests that the developer created. If any issues are present during the building or compiling of the new code, the test environment could provide such notification to the developer so that changes to the code can be implemented. Otherwise, the test environment can carry out the tests and generate information that would be used to provide a display for the developer indicating what portions of the code that the tests cover as well as the outcome of the tests on the covered portions of code. The results of the tests as well as the tests themselves can be stored in a database. Lastly, if the new code is satisfactory, the new code can be implemented into the master code branch.

In step 510, developers create new code and tests used to evaluate the new code on their respective computing devices. A project associated with software application may require that the developer create a new feature or update/modify existing features. In some cases, the new feature or updated feature would be made to an existing application that is currently being used by numerous consumers. For example, a software application may include a massively multiplayer online (MMO) game. Numerous developers may be responsible with updating the MMO game with new content or introduces patches to address current issues in the running of the MMO game. The updates of new content and/or patches may be broken down into teams of developers who would be responsible for writing the new code needed to implement a particular aspect or feature of the new content and/or patches within the MMO game.

Once the new code for the assigned aspect of the new content and/or patch is completed by the developer, the developer would also need to develop accompany tests that would evaluate that the new code is operating as intended. These tests may review whether the new code is outputting proper values and sending the values to the appropriate location as well as check for any security issues that may arise. Developers may also utilize previous tests stored in a test database. Generally the tests would be used to identify any potential issues, errors, or bugs that may be caused if the new code is incorporated into the master code branch or with other new code created by other developers. There may also be tests that generally cover compatibility and formatting of the new code to ensure that the new code is written properly. There may also be tests that evaluate the intended purpose of the written code. For example, if the code is supposed to provide a notification to the player in response to an event occurring within the MMO, the test would check that the notification is indeed outputted when the event occurred.

If no code exists currently within the source control system, because the situation being tested is new, new tests would need to be created (or older tests modified) by the developer to ensure that the code can be properly evaluated. For example, the MMO game may initially be run using a particular platform and all available tests may be associated with ensuring that the MMO is compatible with the platform. However, with an update, the MMO game is planned to be expanded to additional platforms. The older tests would not be usable in testing compatibility with the additional platforms. Therefore, new tests would need to be created (or older tests modified) to ensure that the new code being written would be compatible with the additional platforms being implemented.

In step 520, the new code that was created by the developer is built/compiled using the test environment. For example, a container could be used to run an executable version of the new code. The new code, once compiled, can then be tested using the created tests provided by the developer or older tests stored in the test database.

In step 530, any issues in the building/compilation of the new code can be identified. For example, if the compiler does not understand certain terms used in the code, a notification can be provided to the developer that modifications would be needed before the new code could re-compiled into a working executable.

In step 540, the information from the tests can be processed for display. The tests may look for particular outcomes or results. However, the processing in step 540 aggregates the results so that the user is able to not only understand overall how many tests were successful but also what portions of the new code the tests covered. The processing of the information from the tests can also identify where in the new code the issues arise and details regarding the errors that caused the failing of any tests.

In step 550, the results of the test and the code coverage can be displayed for the user to view. In some embodiments, these illustrations can be in the form of graphs or tables that use color coding to show what portions of the code are covered by existing tests, what portions of code pass related tests, and what portions of code still need to be tested. Further exemplary displays may include a visual map that illustrates the relationship of the new code with the master code branch. The map may include icons that represent different issues between the new code and the master code branch. The map may also use colors to represent the severity of the identified issues.

For example, if the output from the new code is not being properly received by the simulated master code branch, an icon can be used to represent this lack of communication between the new code and the master code branch. A color can be then chosen based on whether or not the simulated master code branch would still be able to operate without the output from the new code. If the simulated master code branch is unable to proceed and causes the application to shut down because of the error, the icon may be illustrated in red. However, if the simulated master code branch would still able to proceed (albeit with a wrong value), the icon may be illustrated in a different color (e.g. yellow).

If no issues/errors/bugs are present, this may be indicative that the new code is acceptable and would be ready to be merged/implemented into the master code branch. In this case, the test environment allow for the merging of the new code into the master code branch in step 570.

The results of the tests (as well as the tests) can be stored into a test database in step 560. The information stored in the test database can be retrieved and referred to, for example, in situations where modifications to that portion would need to be made in subsequent projects.

In step 570, the new code is merged with the master code branch. The master code branch may correspond to an operational software application so ensuring that the new code being merged is satisfactory can minimize interruptions and/or downtime. In some instances, the merging can be done at any time. In some cases, the merging can be done at pre-determined maintenance periods where the application is not being executed (e.g. downtime for the MMO). The latter may be preferred just in case untested issues arise after merging. Furthermore, merging may require that the new code satisfy a pre-requisite amount of code coverage and/or successful test results.

Prior to each merge of branch code, a copy of the current master branch code can be copied and saved into memory as a backup. This backup copy can be labeled with a date/time and version identification. This backup copy can be used to recall a previous version of the master branch code just in case the branch code being merged causes issues/errors/bugs that can't be immediately addressed. The updated master code can be branch can be labeled with a date/time and version identification as well.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A method for identifying applicability of tests to new code sets, the method comprising:
   receiving new code to be merged into a master code branch of an operational software application;
   receiving a plurality of tests, each test applicable to a respective different type of code portion;
   evaluating applicability of the tests to the new code, wherein evaluating the applicability of the tests comprises identifying one or more portions of the new code to which at least one of the tests is applicable and at least one other portion of the new code to which none of the tests is applicable;
   generating a visual map of the new code, wherein the generated visual map:
      illustrates which of the portions of the new code have been identified as the portions to which the at least one of the tests is applicable and which of the portions of the new code have been identified as the at least one other portion to which none of the tests is applicable, and
      indicates an outcome of the at least one test applied to the respective identified portion of the new code;
   storing the outcome of each of the tests applied to the identified portions of the new code in memory; and
   merging the new code into the master code branch based on the outcome of each of the applied tests.

2. The method of claim 1, further comprising receiving a modification to one or more of the tests, the modified tests applicable to test a new function of one of the identified portions of the new code.

3. The method of claim 2, wherein the new function includes one or more new conditions that had not been considered by the master code branch.

4. The method of claim 1, wherein the visual map utilizes different colors each indicating a different severity level of the outcome for each of the identified portions of the new code.

5. The method of claim 1, wherein the visual map utilizes different colors each indicating a different threshold amount of the new code having applicable tests.

6. The method of claim 1, wherein merging the new code into the master code branch includes saving a backup copy of a current version of the master code branch prior to merging.

7. The method of claim 1, wherein the operational software application is a massively multiplayer online game.

8. The method of claim 1, wherein the new code corresponds to new content to be implemented within the operational software application.

9. The method of claim 1, wherein the new code corresponds to a patch for the operational software application.

10. The method of claim 1, further comprising querying for tests stored in memory that are applicable to the new code, wherein the received tests are responsive to the query.

11. The method of claim 1, wherein at least one of the received tests is applicable to identify that the new code has one or more security issues.

12. The method of claim 1, wherein at least one of the received tests is applicable to test compatibility between the new code and the master code branch.

13. The method of claim 1, wherein merging the new code into the master code branch is further based on the identified portions of the new code meeting at least a pre-determined threshold amount within the new code.

14. The method of claim 1, wherein merging the new code into the master code branch is further based on the outcome for each of the applied tests meeting at least a pre-determined threshold amount of satisfactory results.

15. The method of claim 1, wherein at least one of the identified portions of the new code includes a line of the new code, and wherein the visual map illustrates the outcome of the at least one test applied to the line of the new line.

16. A system for identifying applicability of tests to new code sets, the system comprising:
   a development platform that receives:
      new code to be merged into a master code branch of an operational software application, and
      a plurality of tests, each test applicable to a respective different type of code portion;
   a processor that executes instructions stored in memory, the processor executing the instructions to:
      evaluate applicability of the tests to the new code, wherein evaluating the applicability of the tests comprises identifying one or more portions of the new code to which at least one of the tests is applicable and at least one other portion of the new code to which none of the tests is applicable,
      generate a visual map of the new code, wherein the generated visual map:
         illustrates which of the portions of the new code have been identified as the portions to which the at least one of the tests is applicable and which of the portions of the new code have been identified as the at least one other portion to which none of the tests is applicable, and
         indicates an outcome of the at least one test applied to the respective identified portion of the new code, and
      merge the new code into the master code branch based on the outcome of each of the applied tests.

17. The method of claim 1, wherein the visual map also highlights the at least one other portion of the new code to which none of the tests is applicable.

18. A non-transitory computer-readable storage medium, having embodied thereon a program executable by a processor to perform a method for identifying applicability of tests to new code sets, the method comprising:
   receiving new code to be merged into a master code branch of an operational software application;
   receiving a plurality of tests, each test applicable to a respective different type of code portion;
   evaluating applicability of the tests to the new code, wherein evaluating the applicability of the tests comprises identifying one or more portions of the new code to which at least one of the tests is applicable and at least one other portion of the new code to which none of the tests is applicable;
   generating a visual map of the new code, wherein the generated visual map:
      illustrates which of the portions of the new code have been identified as the portions to which the at least one of the tests is applicable and which of the portions of the new code have been identified as the at least one other portion to which none of the tests is applicable, and
      indicates an outcome of the at least one test applied to the respective identified portion of the new code;
   storing the outcome of each of the tests applied to the identified portions of the new code in memory; and
   merging the new code into the master code branch based on the outcome of each of the applied tests.

19. The method of claim 1, wherein the visual map illustrates a plurality of different code portions within a project, and wherein a respective size of each code portion is illustrated in proportion to an overall size of the project.

20. The method of claim 1, wherein the visual map allows access to another visual map associated with a second project, the visual map for the second project illustrating different code portions within the second project.

* * * * *